(12) United States Patent
Lee et al.

(10) Patent No.: US 8,051,185 B2
(45) Date of Patent: Nov. 1, 2011

(54) NETWORK COMMUNICATION THROUGH A SPECIFIED INTERMEDIATE DESTINATION

(75) Inventors: George Lee, San Marino, CA (US); Ryan Witt, Pasadena, CA (US); Cheng Jin, Pasadena, CA (US)

(73) Assignee: Fastsoft, Inc., Pasadena, CA (US)

( * ) Notice: Subject to any disclaimer, the term of this patent is extended or adjusted under 35 U.S.C. 154(b) by 163 days.

(21) Appl. No.: 12/122,567

(22) Filed: May 16, 2008

(65) Prior Publication Data

US 2009/0287968 A1    Nov. 19, 2009

(51) Int. Cl.
*G06F 15/16*    (2006.01)

(52) U.S. Cl. ........................................ 709/228; 709/227

(58) Field of Classification Search ........... 709/227–229
See application file for complete search history.

(56) References Cited

U.S. PATENT DOCUMENTS

| | | | |
|---|---|---|---|
| 5,941,988 A * | 8/1999 | Bhagwat et al. ................ 726/12 |
| 6,108,703 A | 8/2000 | Leighton et al. | |
| 6,189,042 B1 * | 2/2001 | Keller-Tuberg ............... 709/238 |
| 6,275,470 B1 * | 8/2001 | Ricciulli ....................... 370/238 |
| 6,415,323 B1 * | 7/2002 | McCanne et al. ............. 709/225 |
| 6,611,872 B1 | 8/2003 | McCanne | |
| 7,028,333 B2 * | 4/2006 | Tuomenoksa et al. ........... 726/3 |
| 7,334,126 B1 * | 2/2008 | Gilmore et al. ............... 713/168 |
| 7,454,510 B2 * | 11/2008 | Kleyman et al. .............. 709/231 |
| 7,516,216 B2 * | 4/2009 | Ginsberg et al. ............. 709/224 |
| 7,836,493 B2 * | 11/2010 | Xia et al. .......................... 726/9 |
| 2005/0076145 A1 * | 4/2005 | Ben-Zvi et al. ............... 709/245 |
| 2006/0041742 A1 * | 2/2006 | Oba ............................. 713/151 |

* cited by examiner

*Primary Examiner* — Hussein Elchanti

(74) *Attorney, Agent, or Firm* — Morgan, Lewis & Bockius LLP

(57) ABSTRACT

A method of routing communications over a network includes routing the communications to an intermediate destination, for example, a "universal proxy," using a first transport control protocol (TCP), and then routing the communications from the intermediate destination to a recipient using a second TCP. The intermediate destination optionally masks the source when transmitting information to the recipient, and performs packet loss recovery. Optionally, the second TCP includes TCP acceleration not utilized by the first TCP.

18 Claims, 4 Drawing Sheets

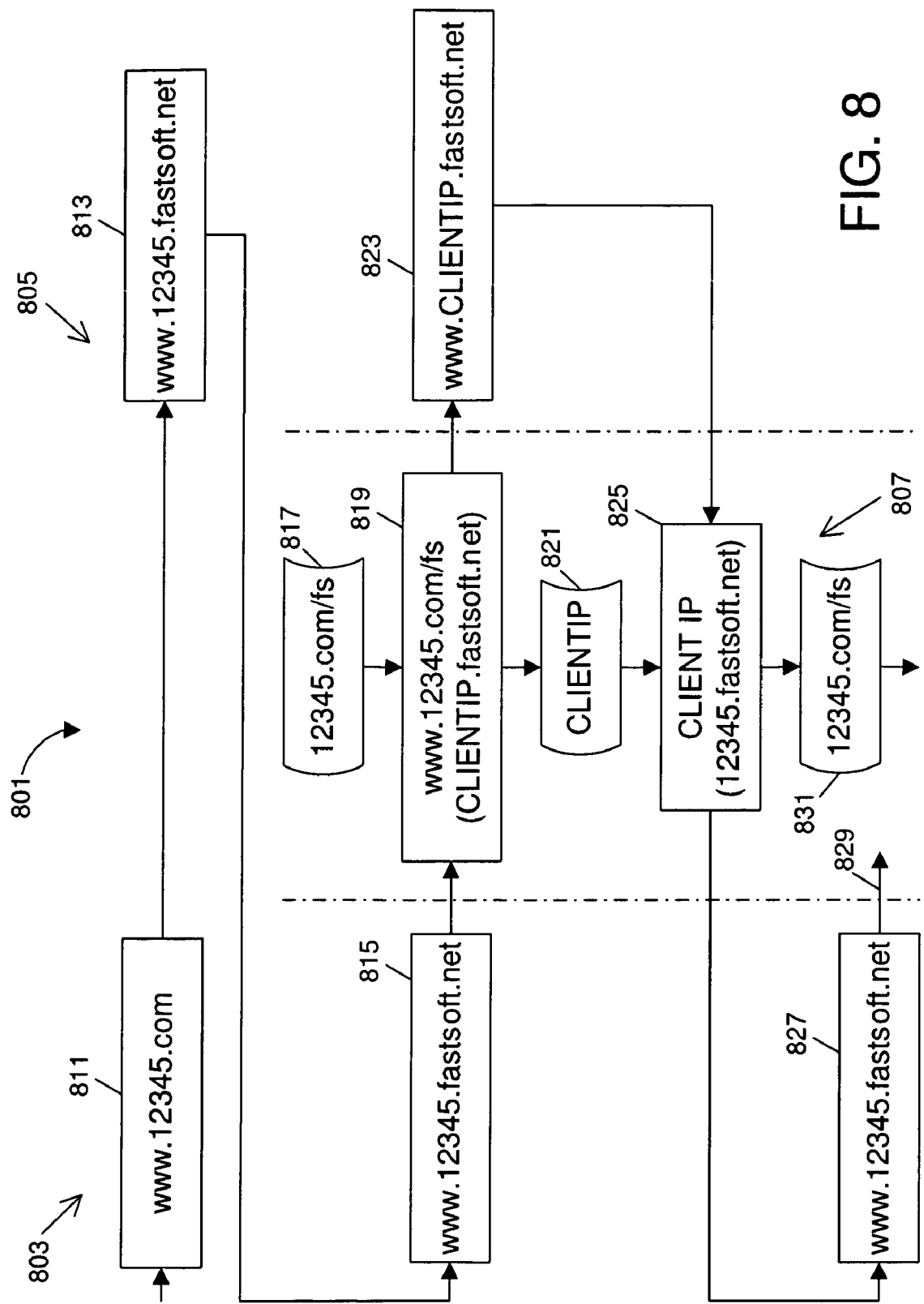

NETWORK COMMUNICATION THROUGH A SPECIFIED INTERMEDIATE DESTINATION

BACKGROUND

Network protocols and equipment are continuously being evolved to keep pace with ever increasing demands. Problems exist, however, which limit the ability of a host to always offer the fastest, most effective service possible. For example, a host that wishes to deliver content, such as a web page, video stream or other type of information, may be using outdated equipment or software that does not keep pace with new developments, and this may constrain information delivery.

What is needed is a way to enable a host or other Internet equipment or service provider to offer better service. Ideally, such a solution would permit any distributor of information the ability to easily deploy specific protocols or equipment without having to invest in new equipment or software, or substantially altering the information to be delivered or its associated structure. The present invention addresses these needs and provides further, related advantages.

SUMMARY

A method of routing communications over a network including routing the communications to be delivered to a recipient through an intermediate destination will be described. The intermediate destination includes, for example, a "universal proxy." The routing of the communications to the intermediate destination includes using a first transport control protocol (TCP). The routing of the communications from the intermediate destination to the recipient includes using a second TCP. The intermediate destination optionally masks the source when transmitting information to the recipient, and performs packet loss recovery. Optionally, the second TCP includes TCP acceleration not utilized by the first TCP.

BRIEF DESCRIPTION OF THE DRAWINGS

FIG. 6 illustrates the SID 607 in relatively close proximity to the host 603, useful, for example, if the SID 607 is employed for purposes of transmission acceleration. Communications from host to SID or from SID to client may be routed through various nodes 612 on the network (e.g., the Internet).

FIG. 7 illustrates some functions associated with the "FastTCP" protocol, including separation of congestion control and loss recovery functions (depicted using numerals 709 and 711 in FIG. 7) such that loss recovery may be performed without necessarily giving rise to instabilities associated with some conventional TCP algorithms.

FIG. 8 is a flow diagram showing one hypothetical example of communications flow based on a client request. In the example of FIG. 8, it should be assumed that the client wishes to access a hypothetical website "www.12345.com" and, further, that this host uses a SID located at "www.fastsoft.net" to provide an acceleration service.

DETAILED DESCRIPTION

Figure 1:
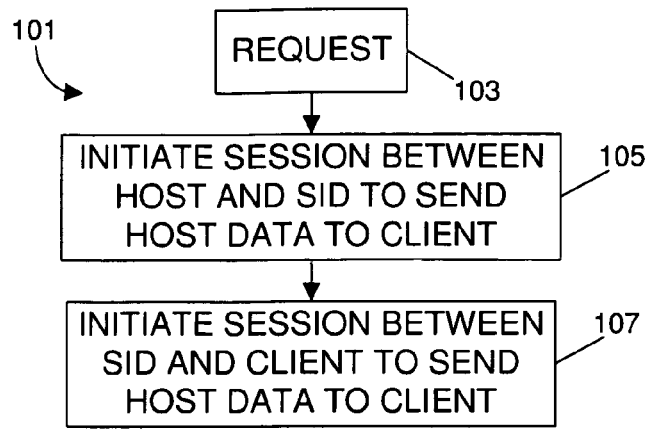
FIG. 1 is a block diagram of a method 101 of distributing content using a specific machine or website. In particular, a session may be initiated between a host (e.g., a sender) and a specified intermediate destination ("SID"), for the purposes of sending data to an end client (e.g., a destination); the SID may then initiate a session with the client to deliver the information. The SID may be used to employ an enhanced transmission protocol (e.g., TCP protocol) to accelerate data, or may be used for other purposes as a "universal" proxy.

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application to certain methods and devices. The description set out below exemplifies (i) a method of transmitting information over a network through an intermediate destination, (ii) a universal proxy, and (iii) a way to provide universal TCP acceleration. The invention, however, may also be applied to other methods and devices as well.

I. Introduction

For purposes of the discussion that follows, it should be assumed that a host wishes to transmit information to a client over a network, such as the Internet. The host can be any machine, website or collection of machines that desires to provide information over a network; by way of non-limiting example, the host can include a personal computer, a server, a website, or some other source of information, and may be operated by a single individual, enterprise, or other entity. The client may be an individual user of a personal computer or other digital device browsing the Internet, or any other desired recipient of this information. Other examples of hosts and clients in a network context are also possible. The host in this example may desire to (a) simply provide an informative web site to the client, (b) offer an interactive service (e.g., such as an online interactive process with the client), (c) stream information such as audio or video to the client, or (d) provide some other type of information to the client. In each of these cases, however, the host wishes to provide some form of information that will be delivered to the client.

Conventionally, a myriad of different network routes might be available to connect the host to the client, each passing through any number and combination of nodes that serve to provide a suitable link from host to client. Normally, the network layer of the sender (e.g., the host) would decide best route or routes for information delivery in a manner transparent to the recipient (e.g., the client); in a conventional situation, the sender would packetize information for delivery to the recipient, with the recipient acknowledging to the sender the identity of received packets, and the sender and the recipient directly cooperating with each other to resolve and remedy packet loss or out of sequence delivery. Overlay networking, or content distribution networks, might be employed to direct a specific information delivery path from sender to recipient, or to distribute content delivery loads to avoid overloading a single host. In the described situations, however, the delivery of information to the recipient would typically be dictated by the specific machine that originally serves the information.

In contrast with this conventional arrangement, FIG. 1 illustrates a flow chart for a method 101 that provides a host with a way to transmit information to a client using a specified intermediate destination ("SID"). The host first receives a request for information or otherwise determines that it needs to deliver information, as depicted by function block 103. Responsive to this need, the host then (transparently) initiates an exchange or "session" directly with the SID, as represented by block 105 in FIG. 1. The SID interacts with the host to ensure proper receipt of information. Following successful receipt of the information, the SID then forwards the information to a client, as depicted by function block 107. As used herein, the term "session" refers to an exchange or transmission-acknowledgment cycle associated with transmitting a piece of information over a network (and should not be confused with conventional Internet meaning "session" as referring to a transaction between a host and end-client, often consisting of multiple communications). That is to say, "session" as used in this disclosure refers to an exchange in which one machine provides information to another, and where lost or corrupted information is detected and remedied between those two machines, such as by way of non-limiting example, via an acknowledgement function, loss detection function and retransmission function. The term "transparently" refers to an operation by the sender that substitutes an SID address into a communication to take the place of the desired destination address in a manner transparent to the application that directs the communication (e.g., in the transport layer or a higher layer).

The host may desire to use the arrangement indicated by FIG. 1 for a number of reasons, including that it may wish to masquerade its identity (e.g., with the information being indirectly delivered to the client by the SID), or that it may wish to employ optimized transmission protocols, or special intermediate node processing for a specific group of destinations, or for some other reason. The scheme employed in FIG. 1 differs from some conventional routing schemes, in that its primary purpose is not to employ the SID to function as a cache in order to offload transmission requirements of the host; rather, the scheme of FIG. 1 calls for the host to transparently route information to the SID in a manner that will be first received by the SID, processed in some manner (e.g., for SID-to-client address translation, error detection and recovery, and for change of checksums for example), and then forwarded by the SID to the ultimate destination; with this scheme, it appears to the ultimate destination that it is the SID that is providing the information (e.g., as provided by the translation). The scheme employed in FIG. 1 also differs from standard overlay routing schemes in that the latter are typically used to specify the route of delivery, with the host and client controlling end-to-end delivery and loss recovery.

Figure 2:
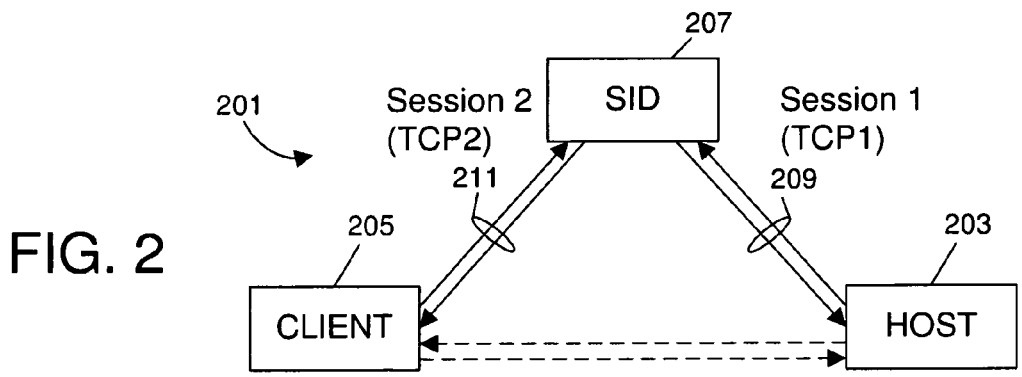
FIG. 2 is a flow diagram that illustrates a first session or exchange 209 initiated between a host 203 and SID 207 and a second session or exchange 211 initiated between a SID 207 and client 205, for purposes of delivering information from the host to the client.

FIG. 2 shows layout of a system 201 that corresponds to the present arrangement. As before, it should be assumed that a host 203 is to provide information to a client 205, such as a user of the Internet. The exchange of information might begin with a client access of the host's URL, a host-initiated action, or a client request presented to a specified intermediate destination ("SID") 207. The identity of the SID may be specified by a web address, or by the client, or by some other mechanism. Direct host-client communications are depicted by dashed lines in FIG. 2. Irrespective of how the interaction is commenced, it should be assumed that the host wishes to use the SID (i) to masquerade its identity, (ii) to take advantage of a speedy transmission protocol, (iii) to use better or more reliable equipment, or (iv) for some other purpose. The host 203 packetizes its information and transmits this information to the SID 207 as part of a first session 209. As part of this session, the SID acknowledges received packets (as represented by reciprocal direction arrows connecting the host and SID) and performs error checking (e.g., checksum verification). The SID processes the received packets to perform address translation and, although not required by the embodiment depicted in FIG. 1, it may also modify those packets or use an optimized protocol for further transmission of those packets to the client 205, for example, using a protocol that may not be supported by the host's own equipment. The SID transmits these packets via a second session 211; that is to say, the client in this example acknowledges packet receipt to the SID 207 and not directly to the host 203.

In this regard, the SID 207 can be configured as a machine that may be accessed from anywhere in a wide area network (e.g., the Internet) and that may be used to redirect communications to any network destination and, in this regard, can be thought of as a "universal proxy;" this universal proxy can also be configured as a "two-way" or "reciprocal" proxy, that is, it may serve as a proxy both for the host for transmitting information over a network, and vice-versa, i.e., for communications directed to the host. As this discussion implies, the universal proxy may be structured as a single device or appliance on the Internet and used as a proxy, even though it is not part of either the host's or client's own network or subnetwork ("subnet"). Utilizing a universal proxy in this manner may serve a number of functions, including those mentioned, e.g., of masquerading the host's identity or providing an accelerator for communications of the host (without requiring the host to upgrade hardware or software). Use of a universal proxy also enables a number of other possible applications. One such application includes the presentation of a virtual network; that is to say, a number of machines or users, by directing traffic through a universal proxy, may appear as originating from a common enterprise or source. Another application enables for-fee acceleration services; that is to say, companies with fast, efficient equipment may offer for-fee Internet acceleration services by configuring their equipment to operate as universal proxies using the teachings of this disclosure. Also, use of a universal proxy in the manner described may facilitate "intermediate node processing," such as for example, in delivery of wireless or special purpose communications; for example, many portable devices have limited size displays, and a universal proxy may be employed to direct communications to a certain class of users, for example, wireless customers using a specific class of device, and to piggyback processing functions to optimize use by those users, for example, by reducing resolution to match the ultimate destinations (which would further optimize communications). Many other applications are possible.

The schemes depicted in FIGS. 1 and 2 provide a host with the ability to affect the way information is delivered to a client without having to necessarily invest in new equipment or software, or substantially restructure the information to be provided. As should be apparent, the embodiments described herein enable a number of service models. For example, by using an intermediate destination, an information provider may effectively lease network protocols, software or equipment not native to the host itself.

FIGS. 3-9 will be used to explain further details and offer additional embodiments and applications.

II. Implementation of a Universal Proxy

Figure 3:
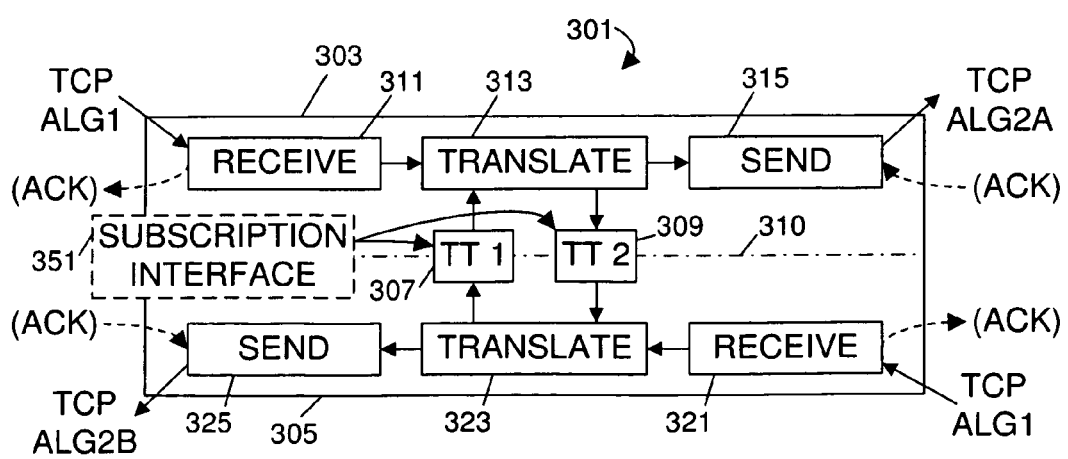
FIG. 3 illustrates one embodiment of an apparatus 301 that may be used as the SID of FIG. 2. This apparatus 301 is seen to include two one-way subunits 303 and 305 that "point" opposite directions; each subunit includes three sections, a first one of which receives inbound communications from a sender (such as a host, not seen in FIG. 3), a second one of which translates successfully received communications, for relay those communications to a client (or another intermediate machine) via the second session, and a third one of which actually handles communications transmission to the client. As depicted in FIG. 3, each one-way subunit may employ if desired an enhanced, "FastTCP" transmission algorithm (labeled "TCP ALG2A" or "TCP ALG2B" in FIG. 3), with each algorithm being the same or being made different. For example, a subunit may employ a TCP control algorithm specially adapted for audiovisual download (thus, the use of different labels in FIG. 3, "TCP ALG2A" and "TCP ALG2B").

FIG. 3 illustrates one embodiment 301 of a universal proxy, namely, one configured for processing two-way communications and for use as a two-way proxy. It may be assumed that one party to the communications (such as the aforementioned client, not seen in FIG. 3) provides communications that arrive at the left-hand side of FIG. 3, while another party to the communications (such as the host, also not seen in FIG. 3), provides communications that arrive at the right-hand side of FIG. 3. To process communications, the universal proxy of FIG. 3 includes what are effectively two subunits for processing one-way communications, 303 and 305, connected by a pair of translation tables 307 and 309.

A first subunit 303 receives inbound communications from the client, as represented by the label "TCP ALG 1" at the upper left-hand side of FIG. 3; this label denotes the use of conventional equipment, transmitting according to a standard TCP protocol such as the well-known TCP-Reno algorithm. A receive function 311 of the proxy handles communications receipt, in a manner that would typically be performed in the transport layer of the ultimate destination, including checksum error detection, and acknowledgment of properly received packets (as depicted by the dashed line arrow that emanates from the receive function 311, labeled "ACK"). For these properly received packets, the receive function 311 then passes the packets to a translate function 313, which will perform source masquerading and perform any address translations and lookups needed to forward communications on to the host. While performed for the embodiment of FIG. 3, it should be noted that strictly speaking, source masquerading may or may not be desired depending upon implementation. For example, in many Internet applications, a host may wish to know client identity, to obtain demographics on website hits and, therefore, it might be desired for source identity to be left unmasked or otherwise preserved. Alternatively, if desired for privacy or other reasons, source demographics might be collected at the universal proxy 301 and shared on a sanitized basis, to preserve anonymity, as part of an extra service offered by the owner of the universal proxy.

In at least some embodiments, communications are received at the universal proxy 301 as a function of the fact that the proxy has been directly addressed by the sender—thus, for the proxy to route communications to the host as part of another session, translation may be utilized to reconfigure the packets received at the proxy, to replace a web address for the proxy (used by the sender of communications) and to instead insert the IP address of the ultimate destination; the first translation table 307 is used for this purpose. The translation table may be a network address translation (NAT) function and, if appropriate to the implementation, may also perform port translation. As part of the translation function, as will be discussed below, new checksums may be calculated for the updated fields, to ensure that content being relayed will function appropriately at the destination (e.g., to the extent that fields may be linked at the ultimate destination to the identity of the machine performing the transmission, i.e., the proxy 301, or to the original sender).

Once packets have been translated and formatted for renewed transmission as part of a separate proxy-destination exchange, the translation function passes packets to the send function 315, which is used to transmit packets to the ultimate destination, e.g., to a host, from the right-hand side of FIG. 3. These outgoing transmissions are depicted by an outbound arrow and the label "TCPALG2A," to denote the fact that a different TCP algorithm may be used for transmission of packets than used in connection with the original transmission of those packets from the client. As will be explained below, one embodiment of a universal proxy, used to accelerate communication as part of a service, specifically uses the "FastTCP" algorithm to optimize transmission. If desired, other transmission protocols can be used. The use of the "FastTCP" algorithm and its advantages will be explained below, in connection with FIG. 7. As should be implicit from this description, the send function 315 handles all communications from the universal proxy to the ultimate destination, including related functions of error detection and recovery (e.g., in a TCP system, should a packet not arrive at its destination, the handling of acknowledgments, and the detection and retransmission of lost packets).

A dashed horizontal line 310 is used to depict conceptual division within the universal proxy 301 of each of the two one-way subunits 303 and 305. Thus, communications which arrive from the right-hand side of FIG. 3 (e.g., from the host) may be handled by similar receive, translate, and send functions (321, 323 and 325, respectively), to send communications arriving from the host onto the client as part of a session between the universal proxy and the client; a second translation table 309 is also used to substitute the client address and to assist translation in the reverse direction, in a like manner as was discussed above. The inbound communications from the host are labeled at the right-hand side of FIG. 3 as "TCP ALG1," indicating the fact that the associated transmission parameters are defined by the host (the algorithm employed may or may not be the same algorithm as employed by the client), with the receive function 321 handling acknowledgment of receipt and correct sequence presentation of received packets. Similarly, the send function 325 of the second one-way subunit may be used to transmit packets from the universal proxy toward the left-hand side of FIG. 3 using a transmission algorithm controlled by the universal proxy, labeled "TCP ALG2B" in FIG. 3; this algorithm may be the same as used for transmission to the host ("TCP ALG2A", discussed above), or it may be adapted to handle communications that are asymmetric with respect to host and client—for example, a special algorithm might be used for streaming applications, wireless device delivery, etc. As with the counterpart send function 315 discussed above, the send function 325 of the second subunit handles all particulars of transmission with the client, including loss recovery, associated with this proxy-client exchange.

Figure 4:
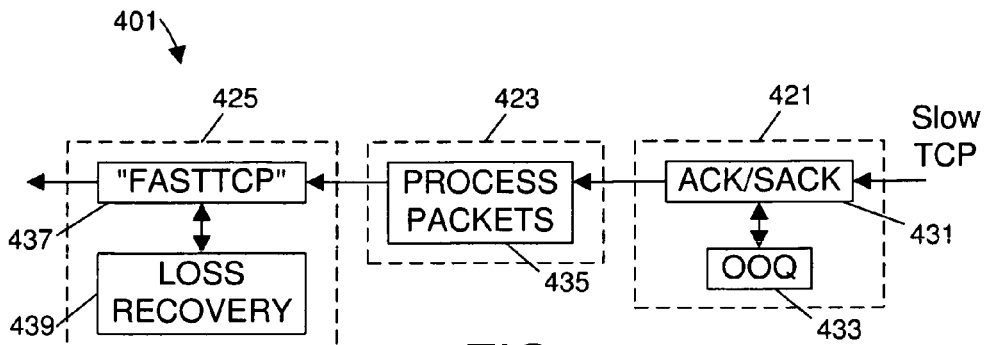
FIG. 4 illustrates the layout of one embodiment of a "one-way" subunit of FIG. 3 (namely, machine 305), and shows additional details for the receive, translate, and send functions. As indicated in FIG. 4, each machine can specify TCP control parameters (such as potentially not natively possessed by the sender) and perform loss recovery independent of the original source (e.g., originating host or client).

FIG. 4 shows in additional detail a single subunit 401. A universal proxy may be configured to have a single subunit (and associated translation table or tables), or it may include two such subunits, configured to point in opposite directions as was described above. The subunit 401 depicted in FIG. 4 may be used as either the first or second proxy (303 or 305 of the embodiment of FIG. 3), although it has been labeled for purposes of description to correspond to the second proxy 305. In particular, the proxy 401 includes send, translate and receive functions 421, 423 and 425. Communications are seen to arrive from the right-hand side of FIG. 4 according to a relatively slow TCP protocol, and the receive function 421 handles the acknowledgment function 431, interacting with the host to ensure proper receipt of communications; the block 431 is labeled "ACK/SACK" to indicate that selective acknowledgement ("SACK") is ideally supported. For correctly received packets, the receive function 431 may pass packets onto the translate function 423. For packets that are received out-of-order, the receive function employs an out-of-order queue ("OOQ"), labeled 433 in FIG. 4, which is used to hold packets until an in-sequence set of packets can be passed on to the translate function 423. Notably, because packets are transmitted to the client as part of a separate session from the proxy's communications with the host, the out-of-order queue is used to ensure effective communications from the proxy 401 to the ultimate destination (the client in this example); this structure serves the purpose of facilitating receipt acknowledgment by the ultimate recipient in a manner consistent with standard TCP protocols and in a manner independent of the original host-to-universal proxy communications (e.g., if the receive function passed out-of-sequence packets, which were then forwarded to the destination, it would render it difficult to identify dropped packets, or to even identify the session in which the packets were lost).

Prior to being relayed on to the ultimate destination, packets are processed by the translate function 423. The translate function, as was alluded to above, performs translation and masquerading as appropriate to substitute the destination address for the proxy address, and the proxy address for the address of the original source of the communications; it may also perform a number of additional packet processing functions, as indicated by function block 435 in FIG. 4. [These functions will be discussed further below, in connection with FIG. 5.] The results of translation are then passed on to the send function 425, which as mentioned above, provides transmission functions including use of an appropriate TCP algorithm such as "FastTCP," and associated loss recovery, all as indicated by reference numerals 425, 437 and 439 in FIG. 4.

Figure 5:
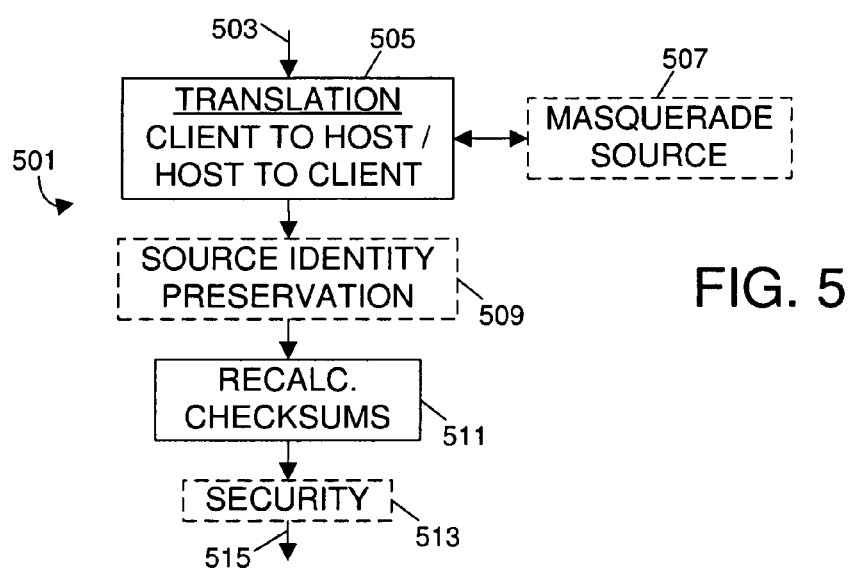
FIG. 5 shows a method 501 of implementing the translate function (313 or 323 of FIG. 3).

FIG. 5 illustrates a method 501 that may be performed to implement the packet processing function of FIG. 4. In particular, inbound packets (represented by numeral 503 in FIG. 5) are first processed for translation and (if desired) to masquerade the source, as indicated by function blocks 505 and 507. In embodiments where it is preferred to preserve source identity, source information removed from address fields or otherwise provided (e.g., in advance) may be inserted into packet header information, as represented by dashed-line function block 509. Whether or not this function is performed, checksums are then recalculated as indicated by block 511. In this regard, the original packets from host to universal proxy would typically include error detection information such as parity checks for the purpose of detecting packet corruption (including address corruption); because changing the destination address in these packets would likely create a mismatch between any original error detection information in the packets as transmitted from the source, the checksums are recalculated using the translated packets and interested into the appropriate location within each packet.

With the error detection information recomputed and appropriately inserted in packets to be transmitted to the ultimate destination, security can then optionally be applied, as indicated by dashed-line block 513. In this regard, security may be applied at the transport layer (such as by using SSL); alternatively, it may also be possible to use a scalable security function that permits decoding and replacement of select packet information (e.g., sender, destination) while using incremental security to prevent decoding of content contained within the packets. [Notably, there exist protocols which permit secure decoding and authentication of packet information while using additional security to prevent decoding of detail (such as audiovisual content).] These functions may be applied in conjunction with the session between the universal proxy and the client, if desired.

Although this description has been couched in terms of TCP, it should also be possible to design implementations for other functions (e.g., such as File Transfer Protocol, or "FTP"). File security at the transport level may raise some additional challenges, and require additional security decoding and encoding in order to ensure proper decoding and operation at the client. These capabilities should be within the level of ordinary skill of a designer familiar with these protocols.

With the translate function 501 suitably modifying packets so as to be suitable for forwarding, the packets are then ready to be passed to the send function, as indicated by reference numeral 515 in FIG. 5. The send function has been introduced above, and will be described further below in the context of a method of using a specific TCP protocol, for example, using "FastTCP" or another algorithm to provide enhanced transmission for communication from the universal proxy to the client.

III. Use of an Intermediate Destination to Provide Network Acceleration

Figure 6:
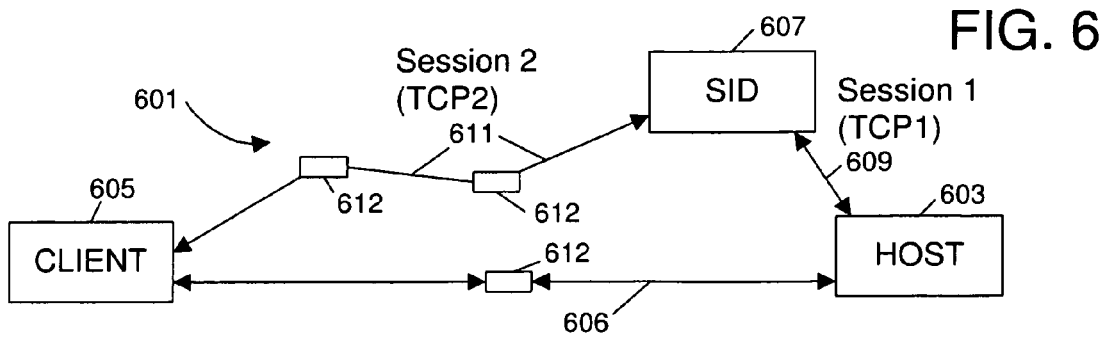
FIG. 6 is a flow diagram similar to FIG. 2, and shows request fulfillment through a SID 607 using at least two exchanges or sessions 609 and 611. Unlike FIG. 2.

FIG. 6 provides a flow diagram similar to FIG. 2, but which shows positioning of an intermediate destination ("SID"), such as one of the "universal proxies" just described, for purposes of Internet acceleration.

In this regard, wide area networks (such as the Internet) are typically characterized as containing a myriad of nodes which are used to enable packets to travel from source to destination by "hopping" from one node to another; the particular path used is typically selected based upon applying a cost function to each of the nodes or node connections to determine a path of least resistance. Even with this structure, bottlenecks can arise based on device or network conditions, or based on heavy message flow, at nearly any place in the network; consequently, in an acceleration application, it typically is desired to use a SID which is relatively close to the source of the information. For example, if a host subscribes to an acceleration service for purposes of delivering multimedia to clients, it will usually be desired to have the SID be relatively close to the host, so that host-to-SID communications are not encumbered by bottlenecks, to take full advantage of acceleration.

FIG. 6 shows a layout 601 including a host 603, a client 605 and a SID 607 that is to be used for acceleration purposes. The client 605 may direct communications 606 to the host 603 for purposes of obtaining information from the host. The host responsively transmits this information to the client 605 using two sessions 609 and 611, including one session between host and SID, and a second session between the SID and the client. Conceptually, the instantiation of the two-sessions may be triggered using one of several different approaches, but the easiest to implement is typically a redirect to the client when the client accesses the host, using conventional means, to cause the client to instead approach the host through the SID 607. For example, if the SID is operated by the host (or the host otherwise has otherwise prearranged service with the SID), the SID may simply dedicate a network address for communications to the host, and the client can be redirected by the host to this address (which then would be used by the SID to trigger a session with the host, with itself as requester and thus recipient of reply host communications). To provide an example that will also be used below in conjunction with the discussion of FIG. 8, if a client wishes to access a site "www.12345.com," the host at this site may simply redirect the client to an address associated with the SID, e.g., "www.12345.fastsoft.net." In a situation in which the use of this address as been preconfigured, this address is adapted to forward communications to the host, inserting itself instead of the client as the requester; in the manner described above, the host then responds to the SID, which then forward to the client. Alternatively, the host 603 may, depending on application, simply initiate a session with the SID, passing the client identity to the SID for the purpose of initiating a second session 611 with the client.

Irrespective of process, as has been heretofore described, the host passes its information for transmission to the client to the SID, as part of a first session 609. As part of this transfer, the host uses TCP control algorithms that it natively supports. The SID 607 is then relied upon to use optimized protocols for purposes of Internet acceleration in connection with the second session 611. As indicated, the client in an acceleration application will typically be further from the SID than the host, and a number of intermediate nodes 612 are depicted in FIG. 6 to illustrate this relationship. As with conventional transport, these nodes 612 will typically function as mere relays, with error and loss detection and retransmission from the SID 607 to the client 605 being handled by the SID.

A. Example

Use of "FastTCP" Acceleration

Figure 7:
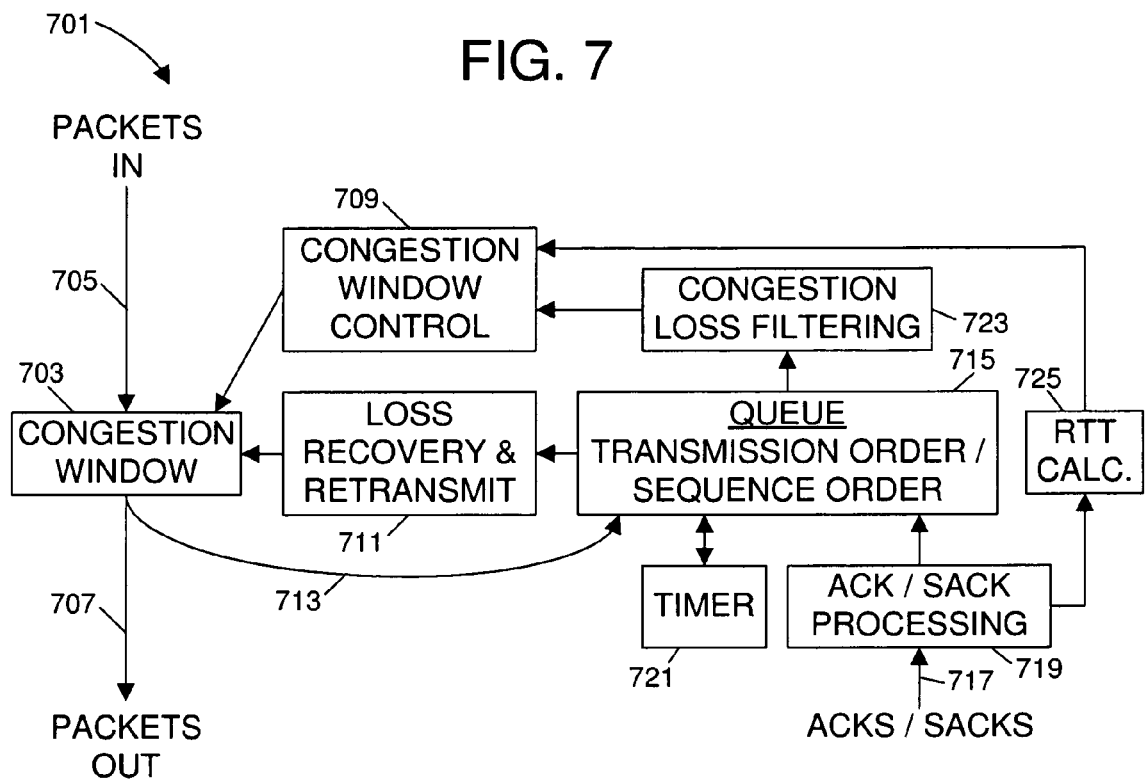
FIG. 7 shows one transmission control algorithm that may be used to transmit packets from the SID in either direction (toward host or client). In particular.

As alluded to earlier, one relatively speedy algorithm that may be advantageously employed for TCP acceleration is an algorithm developed at the California Institute of Technology ("Caltech") and referred to as "FastTCP." The base operation of this algorithm is indicated in FIG. 7, via a flow chart 701.

In particular, the method uses a congestion window 703 to control the rate at which inbound packets 705 (that is, packets provided by a machine such as the universal proxy described above) are transmitted to a destination as "packets out" 707 Most conventional TCP algorithms also use a congestion window in this general manner, but the differences with "FastTCP" lie in the way that this window is controlled, to adjust its size in a manner responsive to estimated network queuing delay, and in a manner that detaches loss recovery from window size adjustment (represented by function blocks 709 and 711 in FIG. 7).

In the embodiment of FIG. 7, packets admitted to the congestion window 703 are also stored in a transmission queue 715, as depicted by a flow arrow 713. The transmission queue maintains transmission order, sequence order and an expiration time for each of the outbound packets 707. Generally speaking, the transmission and sequence orders start out the same for packets immediately after session initialization, but as packets are lost and to be retransmitted, the two orders diverge, with new and retransmitted packets having an increasingly large transmission order relative to sequence order as old packets are retransmitted.

As with conventional algorithms, the "FastTCP" algorithm performs ACK and SACK processing, and removes packets from the transmission queue once as their receipt is acknowledged (as indicated by reference numerals 717 and 719 in FIG. 7). However, unlike conventional algorithms, the "FastTCP" algorithm employs a timer 721 as well as received ACKS and SACKS 717 to check for packet expiration. [Architecturally speaking, the receipt of an acknowledgment and the timer may be used to trigger a function call for the machine to examine the transmission queue to detect lost packets.] For packets for which the expiration time has elapsed, as well as for all later packets in transmission order, these packets may be retransmitted as part of the next window (with the expiration timer then being reset). Packets that are expired are presumed lost and receive a new transmission order and are placed at the head of the next transmission window, as handled by the loss recovery and transmit function 711.

As mentioned, window control is generally detached from loss recovery in the "FastTCP" algorithm. This operation differs from many conventional TCP algorithms, which generally suffer from instability owing to a relatively common practice of reducing congestion window size each and every time a packet is lost. The "FastTCP" algorithm does call for adjusting window size in response to loss, but only for loss that is determined to be "congestion loss," resulting from severe network conditions. In this regard, packets can be lost for a number of reasons, especially in the case of wireless transmissions. Implementations of the "FastTCP" algorithm typically call for filtering to discriminate random loss from congestion loss, most commonly by filtering loss to detect when loss exceeds a drastic rate (e.g., 10 or more packets per window). If loss is this severe, then a congestion loss filtering function 723 throttles back window size as part of the congestion window control function 709; other losses are disregarded by the window control function, and are used only for retransmission of lost packets, with little or no change to window size.

Finally, the "FastTCP" algorithm periodically adjust window size based on an equation that considers estimated detected queuing delay along the route of transmission. With each transmitted packet and associated acknowledgement, the system computes round trip time ("RTT") and measures instantaneous RTT relative to a minimum of all RTTs, with the difference being interpreted as queuing delay. The congestion window control function averages delay for packets for any given window and then updates window size with passage of each defined interval (e.g., receipt of every two acknowledgments). The window update algorithm most frequently associated with "FastTCP" is defined by the following equation $$W(k+1) = 1/2 W(k) + 1/2 \left[ W(k) \left( \frac{d+q_0}{d+q(k)} \right) + \alpha \right] \tag{1}$$

where "V" represents window size at time "k," "d" represents the minimum RTT, "$q_o$" represents a minimum queuing delay to be used in positioning system equilibrium relative to network conditions, "q(k)" is the average queuing delay for a current window (i.e., the average difference of time for average packets with the minimum RTT), and "α" is a parameter used for system adjustment. In the embodiment described above, "α" is normally fixed as a constant but is adjusted in response to congestion loss as well as no congestion loss relative to the last window update (i.e., it may be increased in response to the latter).

Additional details regarding ways to control the congestion window on an equational basis using this parameter may be found in patent application publication US2006/0050640, which is hereby incorporated by reference.

The algorithm referenced above performs well as a general acceleration protocol, because it provides a smooth steady state protocol that is robust to packet loss short of severe network congestion, and because it provides approach to an equilibrium point that takes into account actual network conditions (e.g., queuing delay, as determined in connection with the RTT measurement, referenced above).

Nevertheless, it is possible, as mentioned earlier, to use other algorithms, special equipment, or other forms of processing, depending upon implementation. The present invention is not limited to the use of the "FastTCP" protocol just described, which is provided as one example of a transmission protocol that may be useful for acceleration applications; other protocols will no doubt also be useful depending on application or situation, and other protocols will no doubt be developed as technology continues to evolve.

B. Example of a Hypothetical Access

FIG. 8 is a flow diagram showing one hypothetical example of communications flow 801 based on a client request. In the example of FIG. 8, it should be assumed that the client wishes to access a hypothetical website "www.12345.com" and, further, that this host uses a SID located at "www.fastsoft.net" to provide an acceleration service. The left-hand side 803 of FIG. 8 is used to represent flow of communications as they might arrive at or originate from a client, while the right-hand side 805 of FIG. 8 represents actions that might arrive at or originate from a host. The bottom middle region 807 of FIG. 8 represents flow at a specified intermediate destination "SID."

The client request 811 may be in the form of a website URL that has been typed into a browser location bar, for example, the address "www.12345.com." As is conventional, the website will retrieve information posted by the host at this site; for purposes of accelerating download, the host may redirect the client, as represented by reference numeral 813 and the website name "www.12345.fastsoft.net."

Accordingly, as indicated by reference numeral 815, the client browser makes its request to that referred location, which is advantageously a prearranged location associated with the SID. The website name may be chosen to both access the SID as well as to provide information used to retrieve content from the host for accelerated download; for example, the prefixed name "12345" might be used by the SID to locate a host that has an arrangement with the SID to act as a universal proxy. The SID therefore, as indicated by reference numerals 817 and 819, retrieves an address associated with the information that the host wishes to accelerate, verifies subscription parameters, and otherwise commences a session with the SID as requester to retrieve content from the website "www.12345.com/fs;" in addition, the SID may create a translation file 821 for the client and may advertise its reply address to the host as "www.CLIENTIP.fastsoft.net," to cause the host to reply to the SID and to prefix information that will be used to located the client IP translation file 821. As indicated by block 823, the host responds to this address with information as part of a first session. The SID, as has previously been described, performs receipt and translation functions for in-sequence packets and then relays modified packets to the client; as indicated by reference numeral 825, the SID substitutes the client IP into the destination address headers of received in-sequence packets, identifies itself as sender (using, again, a prefixed name that will identify the specific host and host-SID session), and transmits those packets onto the client as part of a second session. In a situation where further interaction is called for, the client may again repeat the loop, as indicated by reference numerals 827 and 829, to request further content from the host. Finally, with reference to the center, bottommost function block 831, it should be noted that the host may update its translation file as appropriate to the specific interaction, for use in subsequent transmissions.

The example just presented illustrates a situation where the host provides different destination address to the general public (i.e., represented by the SID redirect) than is used for content download; the host could, however, utilize the same address for both purposes. For example, the host could serve content or other information in traditional manner (i.e., by direct HTTP transfer to the client) but inform the client user via a downloaded web page that an alternate site (i.e., the SID site, e.g., "www.12345.fastsoft.net" is available for accelerated mirror service—while not truly a mirror in the sense that content might still be ultimately obtained from the same host, the SID site could be portrayed as a mirror site from the client's perspective). Irrespective of the particular method used, it should be appreciated that using the principles discussed above, the client "sees" information provided by "www.fastsoft.net" as though this site were the host (i.e., not "www.12345.com" of the example presented above).

The foregoing principles may be applied to a number of different applications. For example, it was mentioned earlier that one application of the embodiments presented in this disclosure is to a universal proxy that may be used to masquerade host identity, or to present a number of entities (e.g., a number of different clients) as a virtual entity. The example presented in FIG. 8 may be extended to these and other scenarios in a relatively straightforward manner, that is, by suitable naming changes relative to the hypothetical above. For example, a name other than the actual host name could be provided by the SID to the client, with information used for host access visible only in connection with the session conducted directly between the SID and the host. In the case of a virtual enterprise, a number of different clients could be easily linked to a specific virtual address through appropriate translation table management. Other applications will no doubt occur to those having skill in the art.

IV. Packaging of a Universal Proxy as a Single Internet Appliance

One application of the universal proxy described above, embodied as a one-way or two-way system, is as a network appliance that may be marketed and sold as a single device. In this regard, FastSoft, Inc., of Pasadena, Calif., manufactures such a device, configured in a single chassis for in-line insertion for purposes of TCP acceleration. That is to say, the device is adapted for use in between a standard subnet proxy, and its connection to the Internet.

With suitable configuration, it should be possible to similarly embody a universal proxy as an Internet appliance, i.e., as something that may be installed, configured, and then used either within an enterprise or on the open Internet (e.g., for service bureau applications). Referring back to FIG. 3, a subscription interface 351 may be used in order to permit a service provider to easily set up accounts, and to configure the universal proxy for use on a service bureau basis, and to create directories and associated translation tables. Subscriptions with information providers or those desiring enhanced access may be term based, message volume based, or dynamic based upon individual client requests.

V. Example Application to Content Distribution Network (CDN)

Figure 9:
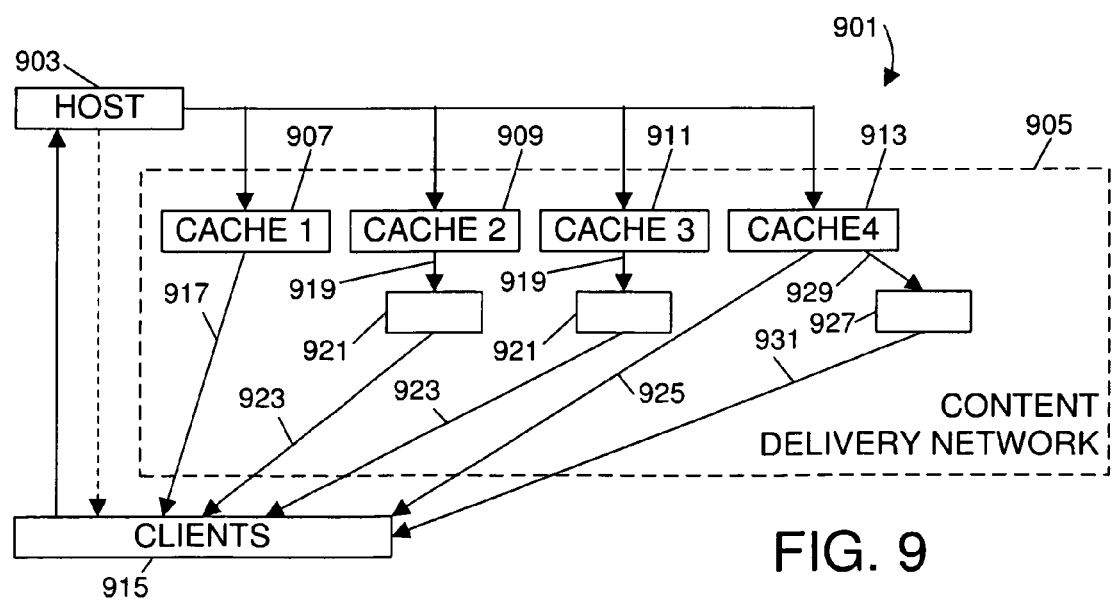
FIG. 9 depicts an embodiment where select communications of a content distribution network ("CDN") are routed through an acceleration machine, such as a "universal proxy" (as introduced above). These proxies are represented by numerals 921 and 927 in FIG. 9, and are shown in different configurations relative to the CDN, in order to illustrate a number of business models and applications of the proxy

Building on the examples of different possible service models, introduced above, FIG. 9 illustrates a number of different ways of applying the embodiments in the context of a content distribution network (CDN). A CDN typically distributes content delivery requirements of a single host in a geographically disparate manner—for example, an operator of a website with a high hit count (e.g., a large number of accesses for video download, such as a news or entertainment site) may experience diminishing quality of service as demand increases. To address this problem, CDNs may distribute copies of the content to geographically-distributed cache sites, which then locally serve all of or a portion of the content without needing to obtain copies from the host in response to each new client request.

FIG. 9 illustrates an arrangement 901 where a host 903 wishes to serve content using a CDN 905. The CDN is illustrated in FIG. 9 to include four cache sites 907, 909, 911 and 913, any one of which may be alternately used to distribute content to clients (depending on client location, for example). Unlike traditional CDN arrangements, however, FIG. 9 illustrates use of a number of different service models that may use the principles disclosed herein.

For example, a first cache 907 is illustrated in FIG. 9 as providing information to a client based on a locally-cached copy of information desired by the client. By contrast, the second and third caches 909 and 911 are depicted to each relay their communications 919 through a SID 921, in the same manner as has been described above. That is to say, the cache may deliver information to the SID 921 as part of a first session 919, with the SID then delivering content to one or more clients via a second session 923. The SID may be used in this hypothetical to deliver a premium service to specific clients (e.g., higher resolution, faster service, etc.), to masquerade source identity, to provide intermediate node processing for a specific class of clients, or for some other purpose. Alternatively, SIDs may be located by the CDN in select geographic areas, such as were bottlenecks frequently occur due to the quality of supporting infrastructure. As indicated at the far right of FIG. 9, clients may also be presented with a choice, for example, between non-accelerated service and accelerated service, as indicated by alternate paths 925 and 931, and depiction of SID and session bifurcation, indicated by reference numerals 927, 929 and 931.

VI. Conclusion

What has been described is a method for providing information over a network in a manner that uses an intermediate destination to optimize delivery. The intermediate destination may provide any of a variety of functions, including masquerading the host, client identity, or both; it may includes some form of desired "intermediate node" processing or service, or it may provide Internet acceleration, for all or part of a message (e.g., audiovisual content). Use of an intermediate destination may enable a host to use specific equipment, software or protocols of a service provider, without having to upgrade the host's own equipment, software or protocols, and without having to substantially reformat content or other information. Other applications will readily occur to those having skill in the art in view of the teachings provided above or the invention defined by the claims set forth below. As indicated above, it is possible to apply the teachings set forth herein to use those teachings with a content delivery network ("CDN") or an overlay or other routing scheme. It is also possible to apply both the principles set forth above with some form of intermediate node caching. Finally, it should be noted that an intermediate destination may be employed to process certain content, but not all content, e.g., it is possible to stream part of a host's website to a client using different methods and different routes, one of which may be directed to the intermediate destination using principles discussed herein.

The embodiment seen in FIG. 1 may be advantageously employed by a host that wishes to use other resources to facilitate delivery of the information to the client. For example, if new equipment exists or a better or faster transmission protocol not possessed by the host exists, the host can specify an intermediate destination that does in fact use the new equipment or better transmission protocol, and then this equipment or better transmission protocol is used for the second session, to facilitate delivery of information to the client. Thus, the embodiment of FIG. 1 may provide selective ability to improve delivery of information from a host to a client notwithstanding that the host does not itself possess optimal resources for direct delivery to the client. In addition, as network equipment or protocols continue to evolve, a host may with relative ease change the parameters used to deliver information to take advantage of new equipment, software or protocols, all with little required effort and without any substantial requirement to update host web pages, equipment, software, etc.

Accordingly, the foregoing discussion is intended to be illustrative only, to provide an example of one particular method and system for configuring a proxy for communications over a network; other designs, uses, alternatives, modifications and improvements will also occur to those having skill in the art which are nonetheless within the spirit and scope of the present disclosure, which is limited and defined only by the following claims and equivalents thereto.

The invention claimed is:

1. A method of providing information over a network, comprising:
   at a first device of a network system:
      receiving a request to provide the information to a recipient;
      in a transport layer, initiating a first session between a sender and a specified intermediate destination by substituting an address of the specified intermediate destination in lieu of a recipient address to transmit information to the specified intermediate address over a wide area network to deliver the information to the recipient, including transmitting the information from the sender to the specified intermediate destination using a first transmission control protocol; and
   at a second device of the network system corresponding to the specified intermediate destination:
      initiating a second session between the specified intermediate destination and the recipient over a wide area network using the recipient address to deliver to the recipient information received from the sender by the specified intermediate destination, including transmitting the information from the specified intermediate destination to the recipient using a second transmission control protocol distinct from the first transmission control protocol, the second transmission control protocol being configured to adjust a congestion window of the second session in accordance with an estimated queuing delay in the second session.

2. The method according to claim 1, wherein the method further comprises:
   causing the specified intermediate destination to acknowledge successful receipt of packets from the sender; and
   as part of the second session, transmitting to the recipient only in-sequence packets that have been received by the specified intermediate destination as part of the first session, and otherwise awaiting delivery and acknowledgment of missing packets before transmitting out-of-sequence packets to the recipient.

3. The method according to claim 1, wherein:
the method further comprises selecting the specified intermediate destination in dependence upon specific transmission parameters employed by the specified intermediate destination;
a first signaling scheme is employed for the first session, dependent upon sender controlled parameters; and
a second signaling scheme is employed for the second session, dependent upon the specific transmission parameters employed by the specified intermediate destination.

4. The method according to claim 3, wherein the specified intermediate destination adjusts the specific transmission parameters in response to measured transmission delay associated with the second session.

5. An apparatus, comprising:
a clock for use in measuring queuing delays;
means for receiving a network communication from a sender in a manner where error detection and recovery is resolved between the sender and the apparatus, the received network communication transmitted by the sender using a first transmission control protocol;
means for readdressing the network communication for delivery to an ultimate destination; and
means for retransmitting the network communication to the ultimate destination in a manner where error detection and recovery is resolved between the apparatus and the ultimate destination, wherein the retransmitting includes retransmitting the network communication from the apparatus to the ultimate destination using a second transmission control protocol distinct from the first transmission control protocol, the second transmission control protocol being configured to adjust a congestion window in accordance with an estimated queuing delay.

6. The apparatus according to claim 5, wherein the means for retransmitting includes means for specifying transmission parameters to be used for retransmitting.

7. The apparatus according to claim 5, further comprising:
means for receiving a return communication from the ultimate destination and acknowledging receipt of the return communication to the ultimate destination;
means for readdressing the return communication for delivery to the sender of the network communication; and
means for retransmitting the return communication to the sender of the network communication.

8. An apparatus, comprising:
a clock for use in measuring queuing delays;
a receive block, to receive first communication over a wide area network from a sender and to resolve error detection and packet loss with the sender, the received first communication sent by the sender by using a first transmission control protocol;
a translate block, to substitute a destination address into the first communication to retransmit the first communication to the destination address; and
a send block, to send the first communication over a wide area network, in a manner where error detection and recovery is resolved, to the destination address using a second transmission control protocol distinct from the first transmission control protocol, the second transmission control protocol being configured to adjust a congestion window in accordance with an estimated queuing delay.

9. The apparatus according to claim 8, wherein:
the receive block includes an out-of-order queue, the receive block adapted to store packets received out-of-order from the sender in the out-of-order queue and to pass in-sequence groups of received packets to the translate block; and
the send block only sends the first communication in the form of in-sequence packets received from the host by the receive block to the destination address.

10. The apparatus according to claim 8, wherein:
the receive block includes a checksum verification function for verifying non-corruption of data associated with received packets; and
the translate block includes a checksum modification function for altering packet checksums at least to compensate for substitution of the destination address.

11. The apparatus according to claim 8, wherein the translate block is adapted to preserve source identity including by, upon substituting the destination address into the first communication, placing source identity into a packet header.

12. The apparatus according to claim 8, wherein the translate block masquerades source address by changing sender information to correspond to a web address associated with the apparatus.

13. The apparatus according to claim 8, wherein the send block uses a transmission protocol that estimates transmission delay in between the send block and the destination address and, responsive to delay, adjusts size of a congestion window used to send the first communication to the destination address.

14. The apparatus according to claim 8, wherein the send block uses a transmission protocol that decouples packet loss from congestion window size adjustment, such that packet loss in transmission from the send block to the destination address does not necessarily affect size of a congestion window used to transmit to the destination address, irrespective of whether the sender adjusts congestion window size in response to packet loss detected by the sender.

15. The apparatus according to claim 8, embodied as an integral device.

16. The apparatus according to claim 8, further comprising at least one translation table for use in mapping communications involving the apparatus to a specific host.

17. The apparatus according to claim 8, configured for use as a two-way proxy.

18. The apparatus according to claim 17, further comprising:
a reply receive block, to receive second communication over a wide area network from the destination address of the first communication and to acknowledge receipt to that destination address;
a reply translate block, to substitute a sender address into the second communication to retransmit the reply communication to the sender of the first communication; and
a reply send block, to send the second communication to the sender of the first communication using transmission parameters of the reply send block.

* * * * *